US011059678B1

(12) United States Patent
Webster et al.

(10) Patent No.: US 11,059,678 B1
(45) Date of Patent: Jul. 13, 2021

(54) BARREL ELEVATOR INCLUDING SHIELDED ACTUATION MECHANISMS

(71) Applicant: PFLOW INDUSTRIES, INC., Milwaukee, WI (US)

(72) Inventors: Mark Webster, Hubertus, WI (US); Michael Reilly, Slinger, WI (US)

(73) Assignee: PFLOW INDUSTRIES, INC., Milwaukee, WI (US)

(*) Notice: Subject to any disclaimer, the term of this patent is extended or adjusted under 35 U.S.C. 154(b) by 0 days.

(21) Appl. No.: 17/112,630

(22) Filed: Dec. 4, 2020

(51) Int. Cl.
| | |
|---|---|
| *B65G 47/57* | (2006.01) |
| *B65G 17/36* | (2006.01) |
| *B65G 17/12* | (2006.01) |
| *B65G 23/30* | (2006.01) |

(52) U.S. Cl.
CPC ........... *B65G 47/57* (2013.01); *B65G 17/123* (2013.01); *B65G 17/36* (2013.01); *B65G 23/30* (2013.01); *B65G 2201/0241* (2013.01); *B65G 2812/02069* (2013.01); *B65G 2812/02287* (2013.01)

(58) Field of Classification Search
CPC .... B65G 17/123; B65G 17/126; B65G 17/36; B65G 23/30; B65G 47/57; B65G 2201/0241; B65G 2812/02069; B65G 2812/02287
See application file for complete search history.

(56) References Cited

U.S. PATENT DOCUMENTS

| | | | | |
|---|---|---|---|---|
| 268,748 | A * | 12/1882 | Stewart | E04H 1/04 52/30 |
| 1,736,584 | A * | 11/1929 | Diago | B65G 23/00 198/801 |
| 1,829,317 | A * | 10/1931 | Waechter | B65G 17/32 198/360 |
| 2,755,950 | A * | 7/1956 | Forshey | A47B 51/00 414/641 |
| 3,534,850 | A * | 10/1970 | Rogers | B65G 1/0407 198/301 |
| 3,557,940 | A | 1/1971 | Rogers et al. | |
| 4,091,939 | A * | 5/1978 | Shimizu | B65G 1/0485 414/274 |
| 10,654,650 | B1 * | 5/2020 | Engle | B65G 47/8823 |

* cited by examiner

*Primary Examiner* — Gene O Crawford
*Assistant Examiner* — Keith R Campbell
(74) *Attorney, Agent, or Firm* — Andrus Intellectual Property Law, LLP (57) ABSTRACT

A barrel elevator system for vertically moving barrels of liquid between a ground floor and any one of a number of floors at a warehouse for storage of the barrels. The barrel elevator system includes a support frame located in an elevator shaft and a series of cradle assemblies supported between a pair of lifting chains. A loading station is located on the ground floor for receiving barrels to be stored or for removing barrels after storage. Each floor includes a unloading station that allows barrels to be removed from the cradle for storage and returned to the cradles after storage. Each of the loading and unloading stations includes a shield assembly to restrict access to the elevator shaft. A rail section and handle are used to load and unload barrels from the cradles. The handle extends through the shield assembly for access by an operator.

14 Claims, 10 Drawing Sheets

BARREL ELEVATOR INCLUDING SHIELDED ACTUATION MECHANISMS

BACKGROUND

The disclosed system generally relates to a barrel elevator for moving barrels of liquid, such as whiskey, from one level of a warehouse or storage location to another level of the warehouse. More specifically, the present disclosure relates to a barrel elevator that includes shielded loading and unloading stations that include rails coupled to a linkage to allow loading and unloading of barrels.

In whiskey warehousing operations, it has been the practice in the past to utilize a building that includes several individual floors. Each floor contains two to three rows of barrel-receiving racks or dunnage. An elevator shaft is located in the warehouse in which a tray or cradle-type elevator is situated. This consists of an endless conveyor trained over upper and lower sprockets, including a series of trays or cradles vertically suspended from the conveyor by hanger members. Thus, the barrels are loaded into the warehouse on the ascending side of the elevator and unloaded on the descending side of the elevator. At the point of loading or unloading, the barrels of whiskey are rolled to one of several levels of barrel-receiving racks and the barrels then remain in said racks for a period of four years or more. Such a system is shown in U.S. Pat. No. 3,557,940.

Although this type of barrel elevator has been used, there are many drawbacks and problems with the loading and unloading of barrels onto the moving cradles. One prominent drawback is the use of loading/unloading rails that are manually positioned to allow the barrels to be either loaded onto the moving cradles or removed from the moving cradles. The present disclosure addresses many of these problems while providing a system that more easily allows for loading and unload of barrels at multiple floors of the warehouse.

SUMMARY

The present disclosure relates to an elevator system for moving barrels of alcohol between floors of a storage warehouse. The elevator system allows for the efficient movement of barrels between a ground floor and multiple storage floors while reducing access to an elevator shaft including the elevator.

The elevator system includes a support frame that extends between and upper end and a lower end. The support frame is designed and sized to be contained within an elevator shaft having a loading side and an unloading side. The support frame creates a support structure for a pair of laterally spaced lifting chains. Each of the lifting chains extends between the upper and lower ends of the support frame. The lifting chains extend around sprockets that can be driving in opposite first and second directions.

A plurality of cradle assemblies are each connected to the pair of lifting chains such that the cradle assemblies move with the movement of the lifting chains. The cradle assembly includes a pair of cradle arms that are designed to support one of the barrels of alcohol. The cradle assemblies are used to support the barrels during movement of the barrels between floors of the warehouse.

The elevator system includes a loading station at the ground floor of the warehouse. The loading station is positioned on the loading side of the elevator shaft. The loading station includes a rail section that is coupled to a handle. The handle is used to move the rail section between a loading position and a storage position. When the rail section is in the loading position, barrels can be loaded onto the cradle assemblies. When the rail section is in the storage position, the rail section is spaced from the movement path of the cradles and supported barrels.

The elevator system includes a plurality of unloading stations, each located at one of the floors of the warehouse. The unloading stations are positioned on the storage side of the elevator shaft. Each unloading station includes a rail section that is coupled to a handle. The handle is used to move the rail section between a loading position and a storage position. When the rail section is in the loading position, barrels can be unloaded from the cradle assemblies. When the rail section is in the storage position, the rail section is spaced from the movement path of the cradles and supported barrel.

The elevator system further includes a shield assembly positioned at each of the loading and unloading stations. The shield assembly includes a barrel opening sized to allow the barrels to pass through the shield assembly. The shield assembly restricts access to the elevator shaft while allowing for loading and unloading of barrels from the series of support cradles.

Various other features, objects and advantages of the invention will be made apparent from the following description taken together with the drawings.

BRIEF DESCRIPTION OF THE DRAWINGS

The drawings illustrate the best mode presently contemplated of carrying out the disclosure. In the drawings.

DETAILED DESCRIPTION

Figure 1:
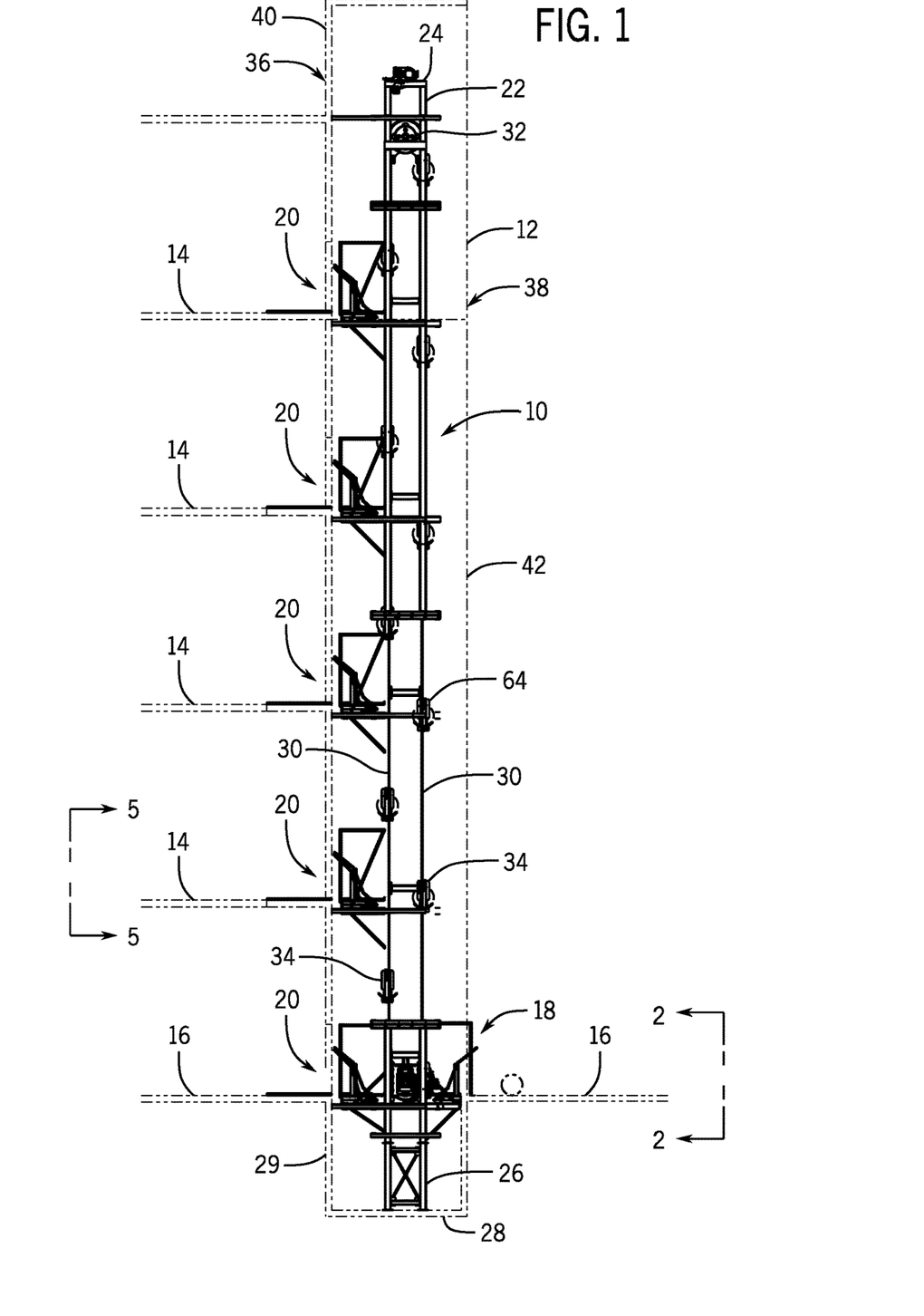
FIG. 1 is a side view of the barrel elevator constructed in accordance with the present disclosure.

FIG. 1 illustrates a barrel elevator 10 constructed in accordance with the present disclosure. The barrel elevator 10 shown in FIG. 1 is located within a warehouse that includes an elevator shaft 12 that extends between multiple different floors 14 within the warehouse. The warehouse includes a ground floor 16 that is typically used to load and unload barrels of alcohol, such as whiskey, to and from the warehouse either before or after the storage term for the alcohol. As indicated previously, each floor 14 generally includes barrel receiving racks that are used to store the barrels of alcohol for extended periods of time, such as one to twenty or more years. Typically, the ground floor 16 is serviced by a loading dock that allows barrels of alcohol from the manufacturing facility to be transported to the warehouse for storage. After the barrels have been stored for the storage term, the barrels are removed from the warehouse for bottling and ultimately, for sale to the consuming public.

In the embodiment shown in FIG. 1, the barrel elevator 10 includes a single loading station 18 included on the ground floor 16 and a series of unloading stations 20 located at each of the individual floors 14. In the embodiment shown in FIG. 1, the warehouse includes four floors in addition to the ground floor 16. The ground floor 16 is shown including its own unloading station 20 that allows barrels of the alcohol to be stored not only on the individual floors but also on the ground floor if desired. It is contemplated that the unloading station 20 on the ground floor 16 could be eliminated in many embodiments.

The barrel elevator 10 includes a support frame 22 that extends between au upper end 24 and a lower end 26, where the lower end 26 is supported on the ground 28. In the embodiment shown, the lower end 26 is below ground level and is received in a pit 29. The support frame 22 is used to support a pair of laterally spaced lifting chains 30 that each pass over an upper sprocket 32 and a lower sprocket. The pair of upper sprockets 32 are mounted to a common drive shaft that is driven by one or more drive motors. The rotation of the upper sprockets 32 cause the pair of lifting chains 30 to move in either a first direction or an opposite second direction. The two directions of movement allow barrels to move in either direction within the storage warehouse.

The barrel elevator 10 further includes a plurality of cradle assemblies 34 that are supported between the pair of spaced lifting chains 30. When the lifting chains 30 are moving in a first direction, the cradle assemblies 34 on the right side of the support frame 22 shown in FIG. 1 are moving upward while the cradle assemblies 34 on the left side of the support frame 22 are moving downward. This first direction of movement is used to load barrels from the loading station 18 to each of the individual unloading stations 20 at the individual floors 14. During an unloading process, in which barrels are moved from the individual floors 14 back to the loading station 18, the direction of movement of the pair of lifting chains 30 is reversed to the second direction. Further details of this operation will be described in greater detail below with reference to the loading station 18 and the series of unloading stations 20.

In the embodiment illustrated in FIG. 1, the elevator shaft 12 includes both a storage side 36 and a loading side 38. The storage side 36 includes an elevator shaft outer wall 40 while the loading side 38 includes an outer wall 42. Since the storage side 36 includes the plurality of unloading stations 20, the wall 40 must have openings at each of the floors that allow barrels to be removed from the barrel elevator 10 during unloading. After the barrels have been stored, the opening at each floor allows the barrels to be returned to the barrel elevator 10 for return to the loading station 18 on the ground floor 16. Since the elevator shaft 12 extends over multiple floors, it is desirable to include some type of shielding assembly at each of the loading and unloading stations to restrict access to the elevator shaft 12.

Figure 2:
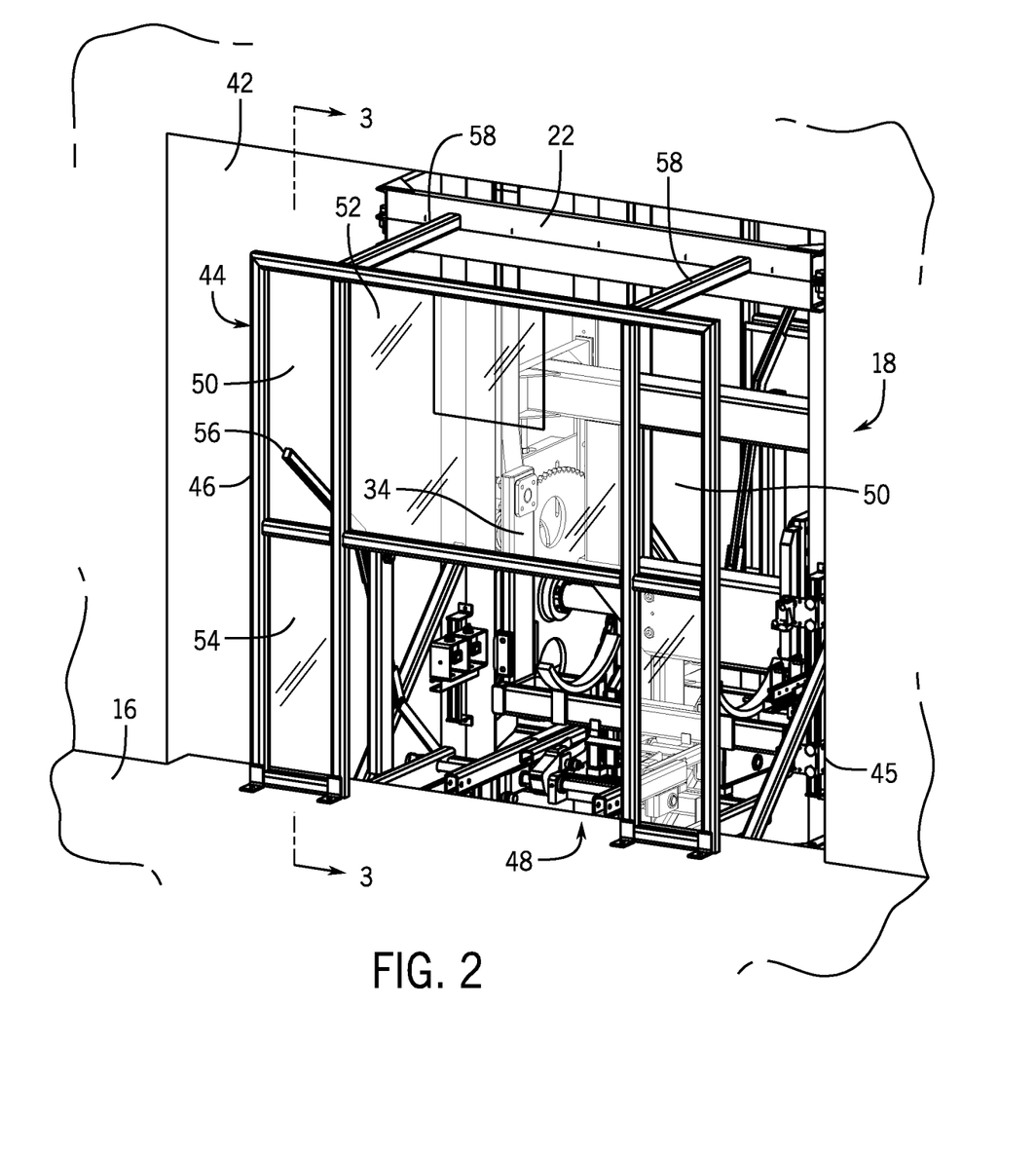
FIG. 2 is a perspective view of the loading station taken along line 2-2 of FIG. 1.

Referring now to FIG. 2, the loading station 18 is shown at the ground floor 16. The loading station 18 includes a shield assembly 44 that is generally aligned with an access opening 45 formed in the back wall 42 of the elevator shaft. Although not shown in FIG. 2, an access door must typically be opened to provide access to the elevator shaft. In some embodiments, the access door is a fire rated door as is required by building codes. The access door is connected to door switch that provides a signal to a control unit as to whether the access door is open or closed. In the embodiment illustrated, the shield assembly 44 includes an outer frame 46 that defines a barrel opening 48. The barrel opening 48 allows a barrel to be rolled through the shield assembly 44 and onto one of the cradle assemblies 34.

The shield assembly 44 further includes a pair of handle openings 50 positioned on opposite sides of a center viewing window 52. The viewing window 52 includes a transparent material, such as glass, plastic or perforated metal, that allows an operator to view into the elevator shaft without providing unrestricted access to the elevator shaft. A pair of lower windows 54 are positioned beneath each of the handle openings 50 to provide additional opportunity to view the interior of the elevator shaft. The handle opening 50 allows a handle 56 to extend through the shield assembly 44 for operation by an operator. In the embodiment shown in FIG. 2, the entire shield assembly 44 is mounted to the floor 14 and supported by a pair of beams 58 that are connected to the support frame 22 of the barrel elevator.

Figure 3:
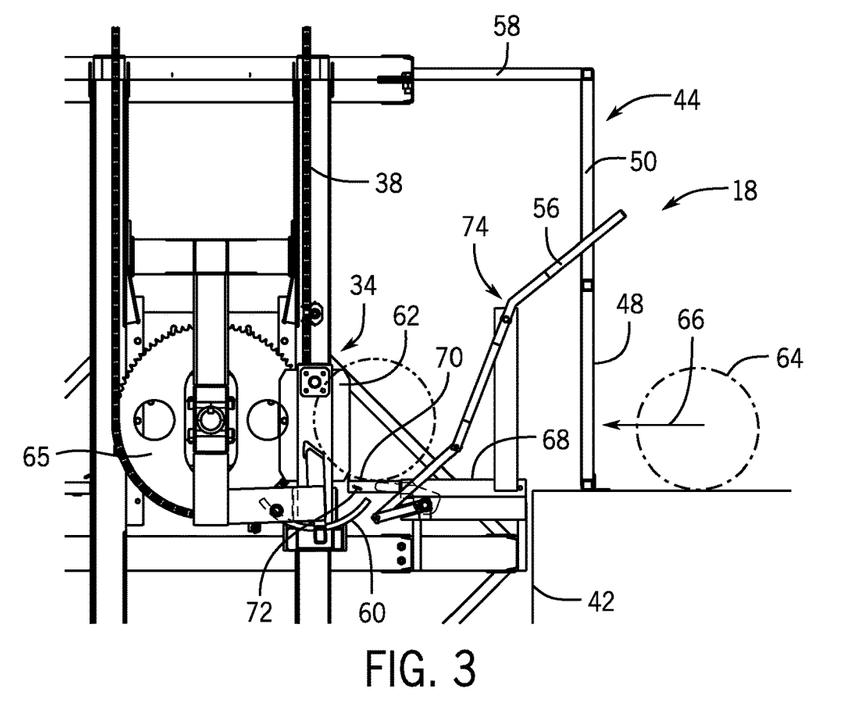
FIG. 3 is a side view of the loading station taken along 3-3 of FIG. 2.

FIG. 3 illustrates additional details of the loading station 18 and the cradle assembly 34. As seen in FIG. 3, the cradle assembly 34 includes a pair of cradle arms 60 each supported between a pair of hanger arms 62. The hanger arms 62 are each mounted to one of the lifting chains 30. The cradle arms 60 are designed to have a radius of curvature that generally matches the outer diameter of one of the barrels 64 that are being loaded utilizing the barrel elevator of the present disclosure. The cradle arms 60 provide for secure engagement of the barrel during the bi-directional movement between the multiple floors at the warehouse.

When a barrel 64 is to be loaded onto one of the cradle assemblies 34, the barrel 64 is moved in the direction shown by arrow 66. The barrel 64 passes through the barrel opening 48 formed in the shield assembly 44 and passes over the edge of outer wall 42 that defines the loading side of the elevator shaft. The barrel 64 travels onto a support track 68 and is ultimately supported by a pair of rails 70 of a movable rail section 72. In the embodiment shown in FIGS. 3 and 4, the rail section 72 is shown in its loading position that allows each individual barrel 64 to move into position for loading on one of the cradle assemblies 34.

Figure 4:
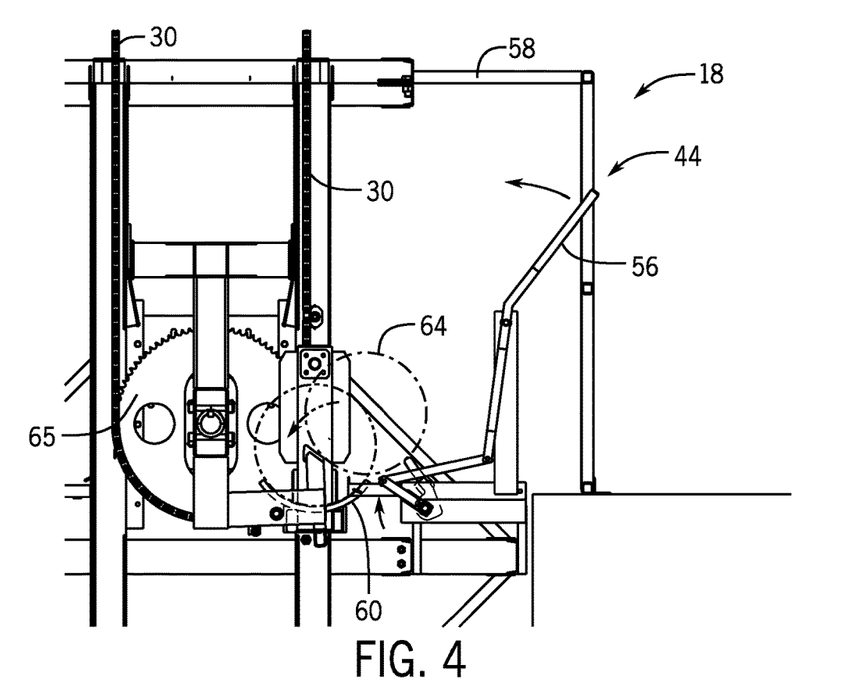
FIG. 4 is a side view similar to FIG. 3 showing the loading of a barrel onto the elevator.

When the barrel 64 is in the proper position for loading onto the conveyor, as shown in FIG. 3, the user can grab the handles 56 and move the handle 56 upward as shown in FIG. 4. This upward movement of the handle 56 causes the rail section 72 to move upward into a loading position. When the rail section 72 moves into the loading position, the rail section changes the state of an loading station rail switch (not shown) that provides a signal to a control unit indicating whether rail section 72 is in the loading/unloading position or located away from the moving conveyor. When the rail section 72 is in the loading position, the user can push the barrel 64 further forward until the barrel is in position to be received on the cradle arms 60 when the cradle arms move past the loading station 18, as shown in FIG. 4. As the cradle assembly 34 moves upward and away from the loading station 18, the barrel 64 is supported by the cradle arms 60. In the embodiment shown, the drive motor can slow down as the cradle assembly 34 approaches the loading station 18 to more smoothly pick up the barrel. In such an embodiment, the drive motor is a variable speed drive motor. However, it is contemplated that the drive motor could be operated at a constant speed, thereby eliminating the need and cost of a variable speed drive motor. FIG. 1 illustrates a plurality of barrels 64 being moved from the loading station 18 to the desired floor and desired unloading station 20.

Referring back again to FIG. 2, the shield assembly 44 prevents the operator from moving past the shield assembly while providing for the required barrel opening 48 and handle openings 50.

As illustrated in FIGS. 3 and 4, the handle 56 is part of a larger handle section 74 that includes a plurality of linkages that allow an operator to move the rail section 72 between loading and unloading positions. The linkage between the handle 56 and the rail section 72 allows for remote positioning of the rails, thus allowing the use of the shield assembly 44. When the rail section 72 is in the loading position, one of the barrels can be moved by the operator from a staging position shown in FIG. 3 to the loaded position shown in FIG. 4. This process is continuously repeated as each individual barrel 64 is loaded onto one of the cradle assemblies 34.

Figure 5:
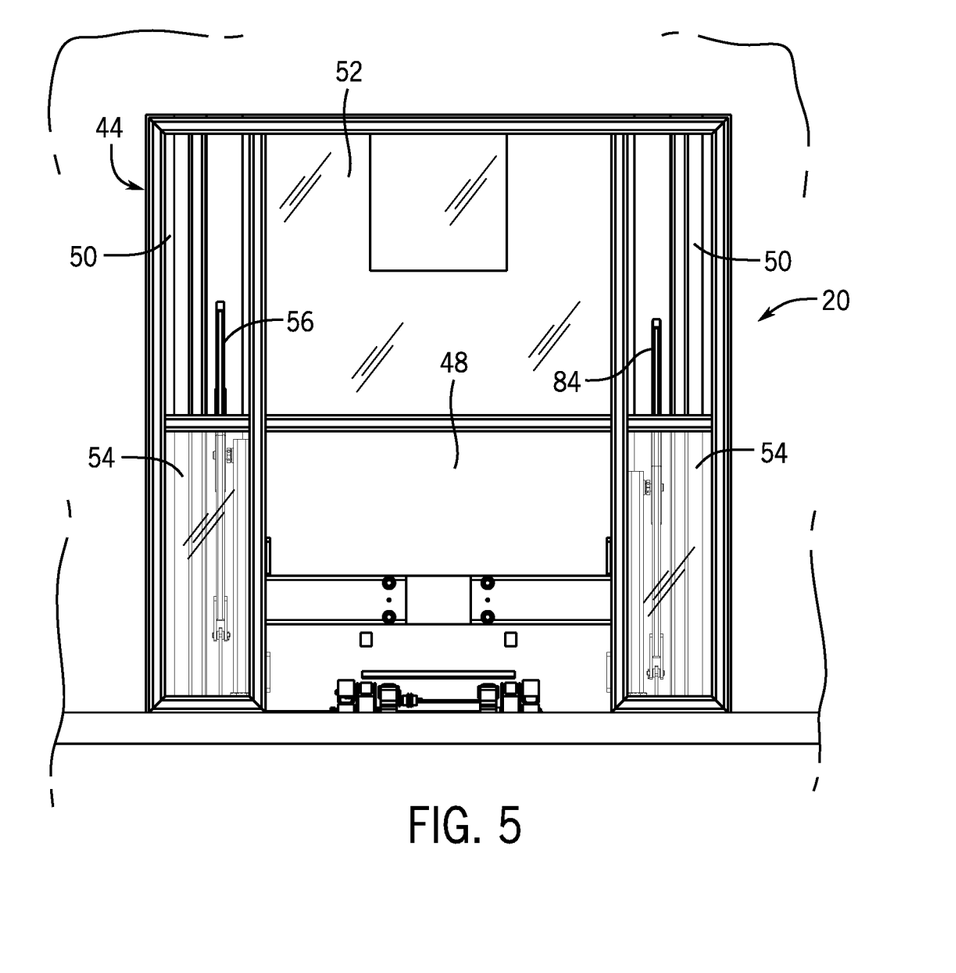
FIG. 5 is a side view of one of the unloading stations taken along line 5-5 of FIG. 1.

FIG. 5 illustrates one of the plurality of unloading stations 20 that are each positioned at one of the plurality of floors 14 of the warehouse. As with the loading station 20 discussed above, an access door must typically be opened to provide access to the elevator shaft on the floor of the unloading station. In some embodiments, the access door is a fire rated door as is required by building codes. The access door is connected to door switch that provides a signal to a control unit as to whether the access door is open or closed. Like the loading station 18 shown in FIG. 2, the unloading station 20 includes a similar shield assembly 44 that includes a barrel opening 48, a viewing window 52, a pair of handle openings 50 and a pair of lower windows 54. The shield assembly 44 again restricts a user/operator from entering into the elevator shaft while still allowing the operator to control the function and operation of each of the individual unloading stations 20. In the embodiment shown in FIG. 5, a first handle 56 and a second handle 84 are each accessible through one of the handle openings 50.

Figure 6:
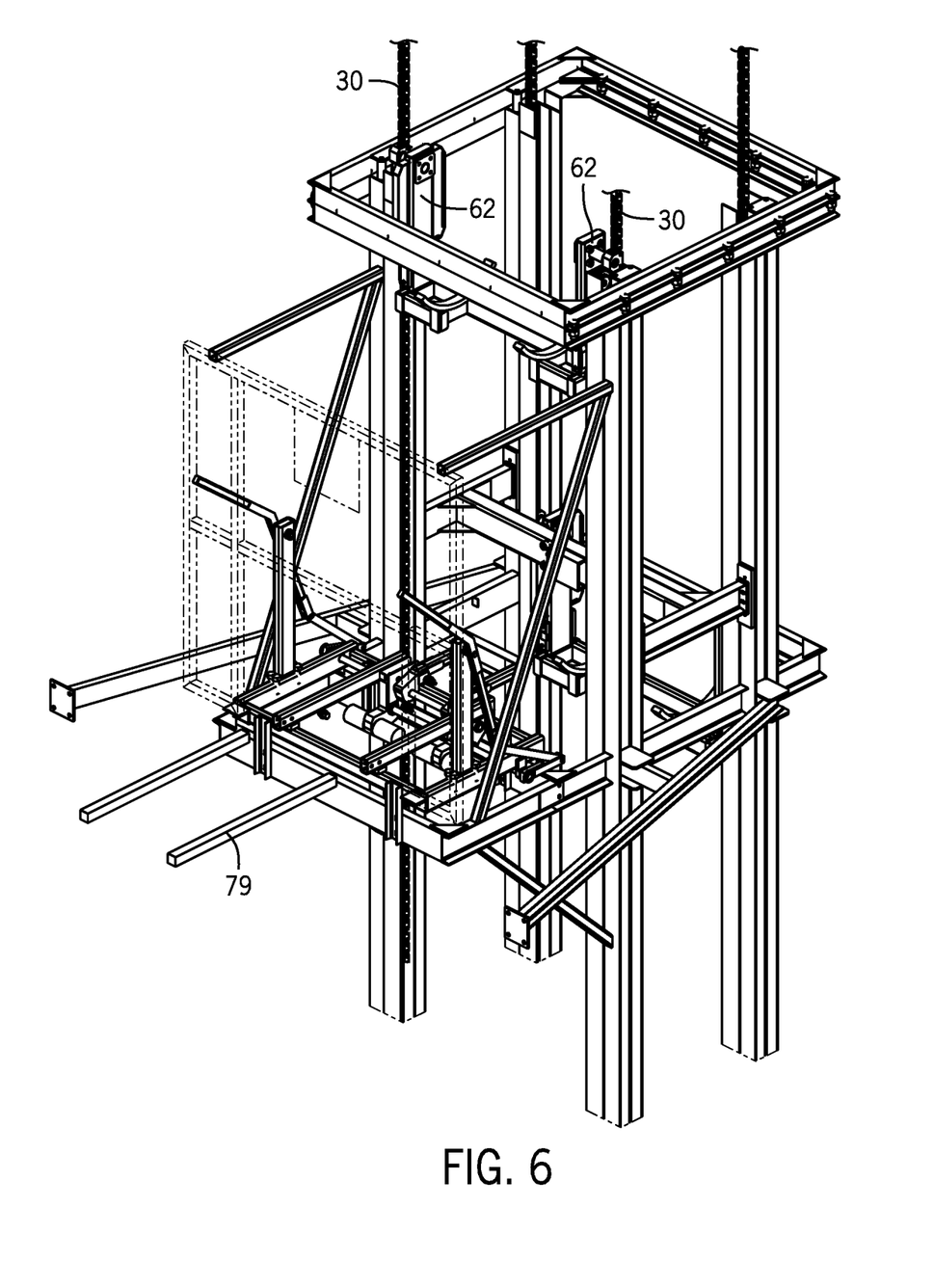
FIG. 6 is a perspective view showing the mechanical components of one of the unloading stations.
Figure 7:
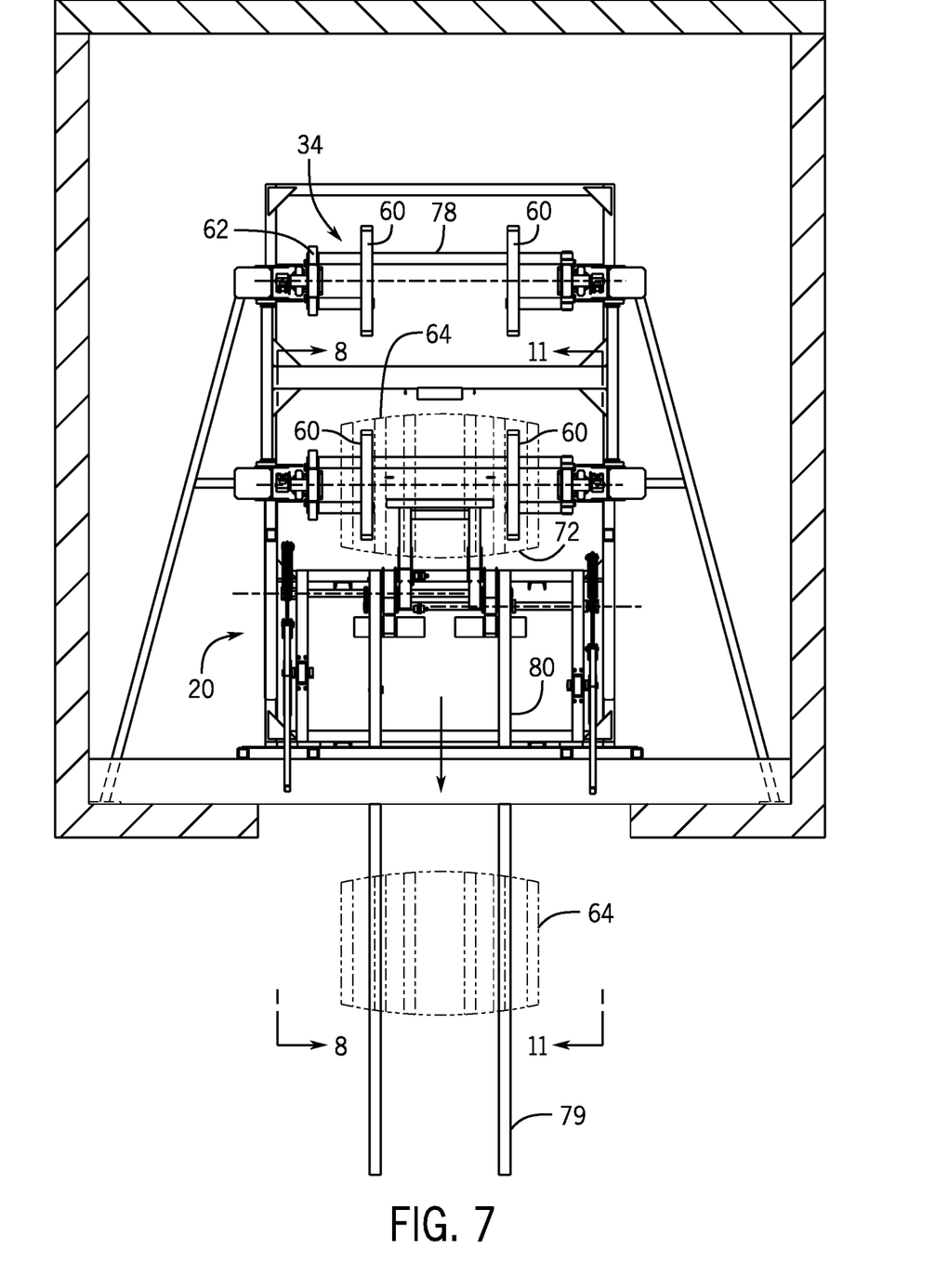
FIG. 7 is a top view of the unloading station.

FIGS. 6 and 7 illustrate the movement of one of the barrels 64 as the barrel is unloaded at a specific floor. As shown in FIGS. 6 and 7, each floor includes a pair of guide rails 79 that are used to roll a barrel along the floor to a desired location for movement and ultimately for storage. FIG. 6 illustrates the pair of laterally spaced lifting chains 30 that are each used to support opposite hanger arms 62 of each cradle assembly 34. The top view shown in FIG. 7 illustrates that the cradle arms 60 are each connected to a transverse bar 78 which provides additional support for the barrel when the barrel is received on the cradle assembly 34. In the embodiment shown in FIG. 7, the movable rail section 72 is in the loading position such that each individual barrel 64 can be received along the rails 80 at the unloading station 20. In this manner, each barrel 64 can be rolled away from the barrel elevator for storage at the individual floor. When the rail section 72 moves into the loading position, the rail section changes the state of an unloading station rail switch (not shown) that provides a signal to a control unit indicating whether rail section 72 is in the loading/unloading position or located away from the moving conveyor.

Figure 8:
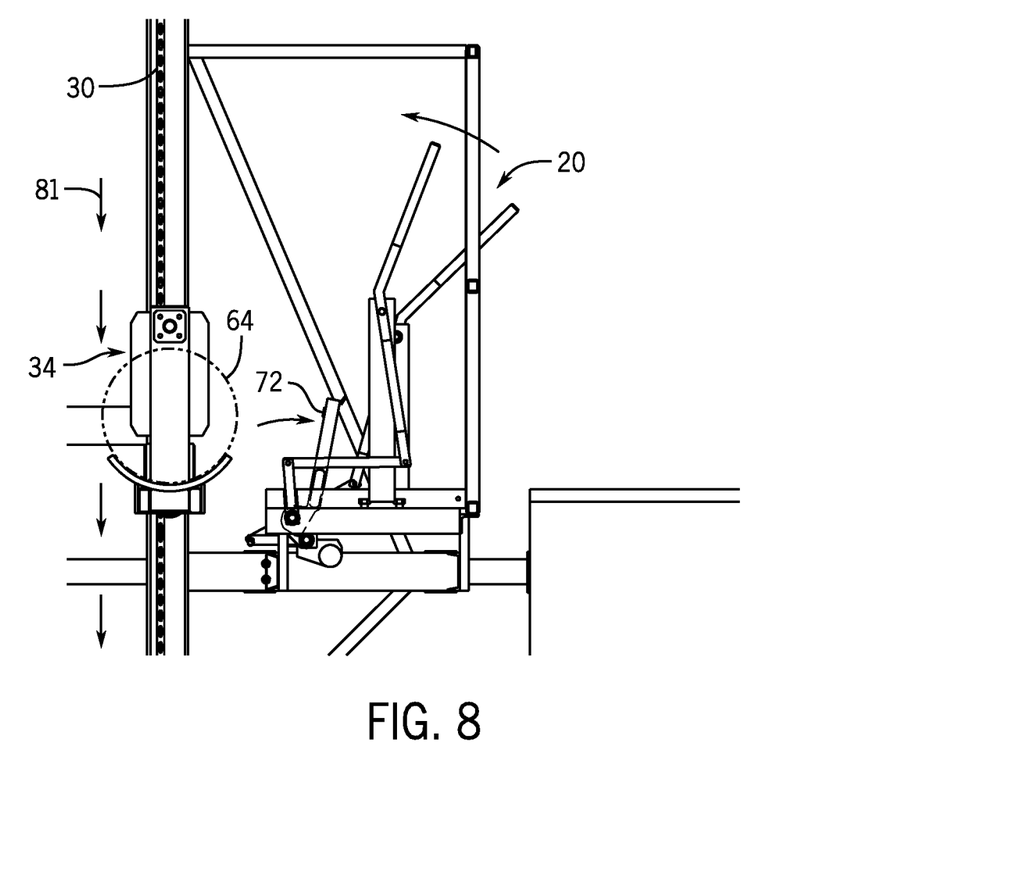
FIG. 8 is a side view of the unloading station taken along line 8-8 of FIG. 7.
Figure 9:
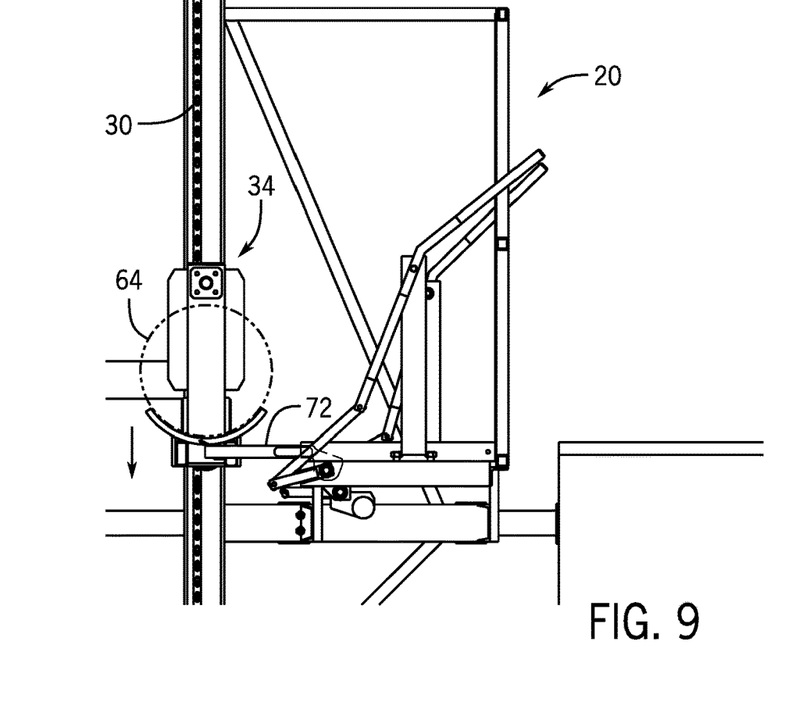
FIG. 9 is a side view similar to FIG. 8 showing the movement of the rail section from the storage position to the loading position.
Figure 10:
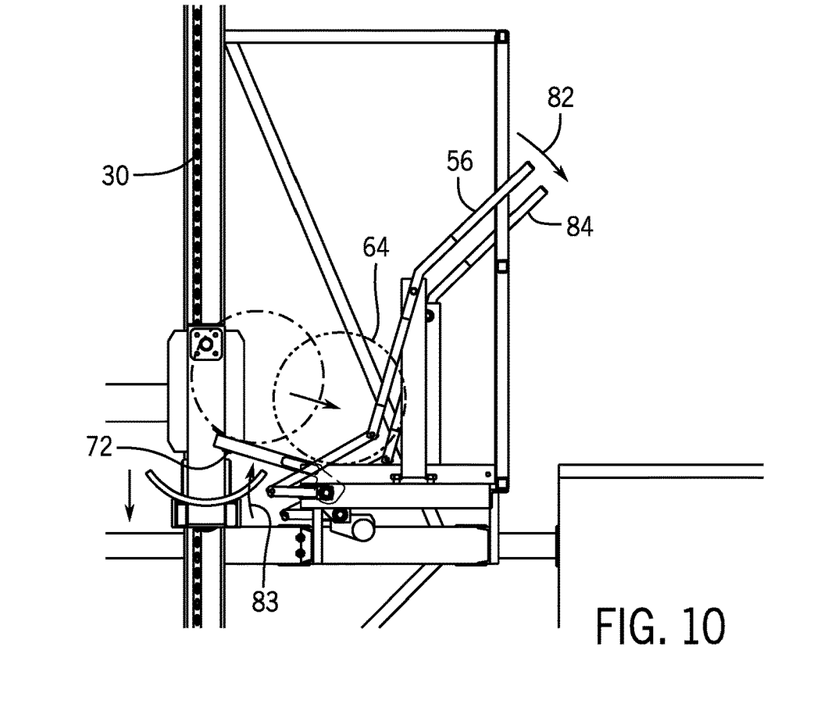
FIG. 10 is a view similar to FIG. 9 showing the movement of the rail section to unload the barrel.
Figure 11:
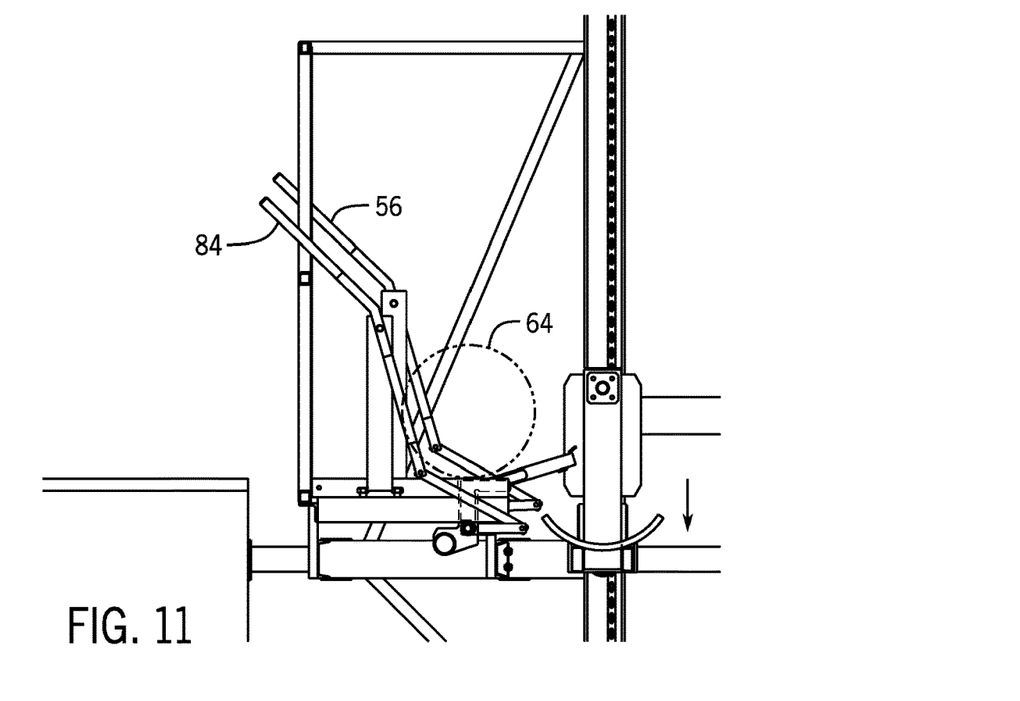
FIG. 11 is an opposite side view taken along line 11-11 of FIG. 7.
Figure 12:
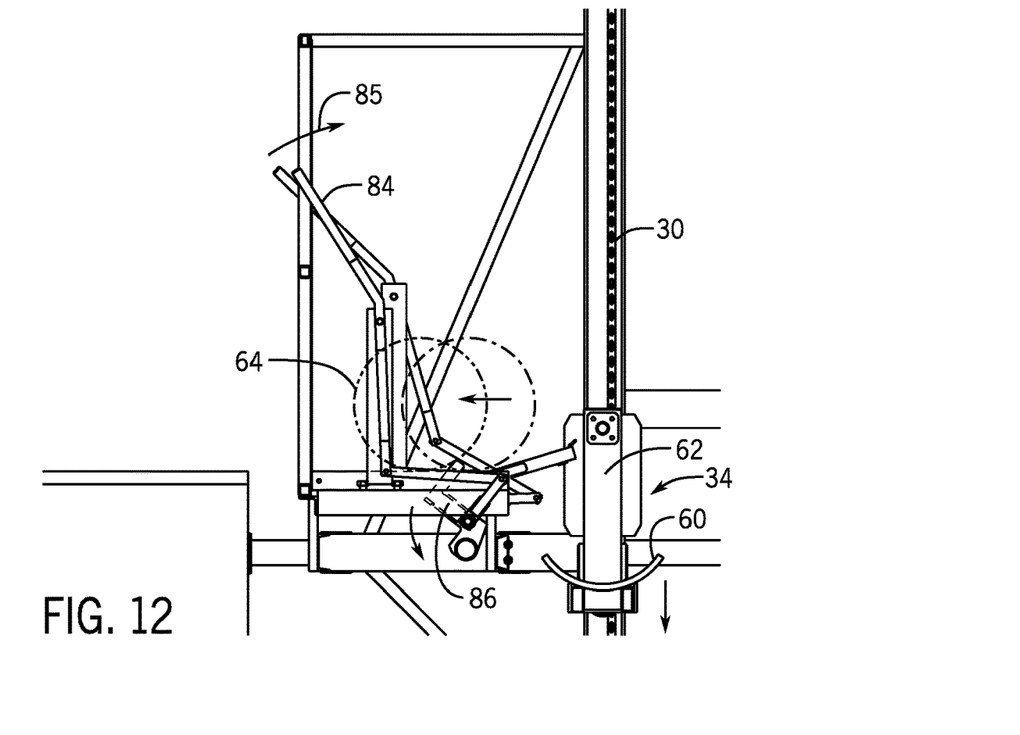
FIG. 12 is a side view showing movement of the handle section.

FIGS. 8-10 illustrate the sequence of steps and operation utilized to remove one of the barrels 64 from the cradle assembly 34. As illustrated in FIG. 8, each of the cradle assemblies 34 and the associated lifting chains 30 are moving in a downward direction illustrated by arrow 81. FIG. 8 illustrates the unloading station 20 when the rail section 72 is in its raised, storage position. In this storage position, the rail section 72 is moved away from the path of the cradle assemblies 34 such that the barrels can move past the floor on which the unloading station is located. As can be understood in FIG. 1, each of the unloading stations 20 would be in this condition except for the single floor where barrels are going to be unloaded. The series of unloading station rail switches provide an indication of the status of the rail sections at each unloading station to a control unit.

Referring now to FIG. 9, the unloading station 20 is shown at the floor where barrels are to be unloaded. At this floor, the rail section 72 is moved to the loading position in which the rail section extends to the path of the moving cradle assembly 34. The rail section 72 has a width that is less than the distance between the pair of cradle arms 60, as best shown in the top view of FIG. 7. In this loading position, the rail section 72 contacts the barrel 64 as the cradle assembly 34 moves downward past the unloading station 20. As discussed previously, the cradle assemblies 34 can be moved at a constant speed or can be slowed slightly as the cradle assembly 34 approaches the floor including the unloading station 20 where barrels are going to be stored.

In the view shown in FIG. 10, the rail section 72 is moved into an inclined unloading position. In this inclined unloading position, once the barrel 64 is supported on the rail section 72, barrel rolls away from the cradle assembly 34 along the rail section 72 under the force of gravity. The handle 56 is moved downward as illustrated by arrow 82 which causes the rail section 72 to move upward into the inclined, unloading position as illustrated by arrow 83. This upward movement of the rail section 72 allows the barrel 64 to roll away from the lifting chains 30 due to gravity.

In this manner, the pair of handles 56 and 84 can be used to actively unload a barrel from the moving cradle assembly 34. As can be understood in the above description, individual barrels can be moved from the unloading station 18 shown in FIG. 1 to one of the unloading stations 20 at the desired floor 14. The unloading stations 20 at floors not being loaded are operated such that the rail section does not cause a barrel to be unloaded at the desired floor. Once all of the barrels have been loaded to a desired floor, the unloading station 20 is returned to the storage condition shown in FIG. 8 and an operator moves to the next desired floor to move the rail section 72 into the unloading position shown in FIG. 9. This process continues at each selected floor until the barrels have loaded into the desired location from the loading station.

After barrels have been stored at a desired floor for a desired storage time, such as five or more years, the barrels can be unloaded from each individual floor by reversing the steps shown and described above. Further, at this time, the rotating direction of each of the lifting chains is reversed. With reference to FIG. 9, if the moving direction of the lifting chains 30 are reversed, the barrels would be loaded onto each of the cradle assemblies 34 and moved in an upward direction until the barrels eventually were returned to the loading station 18. When the barrels reach the loading station 18, the downward movement of the cradle assembly causes the barrel to be discharged at the loading station 18 in a similar manner as described for each of the unloading stations. In this manner, the barrel elevator can be utilized to not only load barrels to desired floors of a warehouse but also to retrieve barrels after storage.

Figure 13:
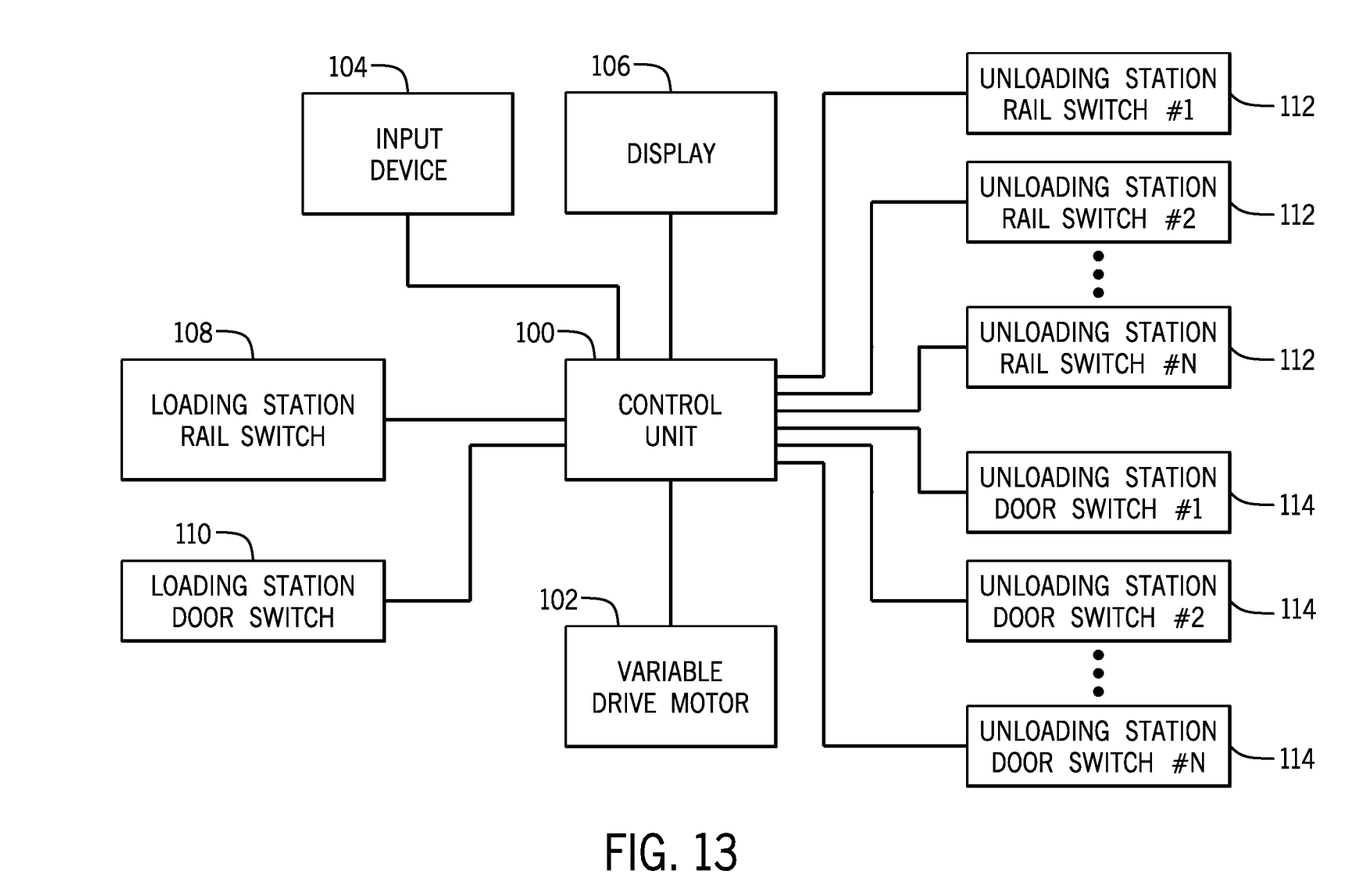
FIG. 13 is a schematic illustration of the control arrangement for the barrel elevator.

FIG. 13 is a schematic illustration of the control system used to operate the conveyor system of the present disclosure. As shown, the control system includes a control unit 100 that operates to control all of the functions of the conveyor system. The control unit 100 is in operative communication with the variable speed and direction drive motor 102. The drive motor 102 controls the direction and speed of movement of the lifting chains 30 and the associated cradle assemblies 34 as discussed above. This control allows the user to control the loading and unloading of barrels through a user input device 104. The user input device 104 can be any type of input device, such as a touch screen, that allows the user to communicate with the control unit 100. The input device 104 could be hardwire connected to the control unit 100 or could communicate using conventional wireless communication techniques, such as WiFi or Bluetooth.

In addition to the input device 104, a display 106 is shown connected to the control unit 100. It is contemplated that the display 106 could be separate or integrated with the input device 104, such as through a touch screen. The display 106 allows the control unit to communicate the status of the conveyor system to the user during operation.

As discussed above, a loading station rail switch 108 and a loading station door switch 110 are located on the floor that includes the loading station. The rail switch 108 provides a signal to the control unit 100 indicating the current position of the rail section at the loading station, while the door switch 110 provides an indication of the current state of the access door on the floor of the loading station.

As also discussed above, an unloading station rail switch 112 and an unloading station door switch 114 are located on each floor that includes an unloading station. In the embodiment shown, a total of "n" floors are at the facility that includes the conveyor system of the present disclosure. The rail switches 112 each provide a signal to the control unit 100 indicating the current position of the rail section at the unloading station at each of the floors, while the door switches 114 each provide an indication of the current state of the access door on the floor of the unloading station.

During operation of the conveyor system, the control unit 100 monitors the rail switches and the door switches to properly operate the conveyor system. The control unit 100 is programmed such that the drive motor 102 will operate when only one of the rail sections at the plurality of unloading stations are in the raised, loading/unloading position. This insures that barrels will be unload at only the single, desired floor. If more than one rail section is extended, the control unit 100 will stop operation of the drive motor 102 and provide an indication to the user either through an alarm or indicator on the display 106.

In addition to monitoring the position of the rail sections, the control unit 100 also monitors the position of the access doors on each floor of the storage facility. The control unit 100 will allow operation of the drive motor 102 only when the door to the desired floor is open and all other doors are closed. In this manner, the control unit 100 can control the operation of the conveyor system by knowing the state of the rail sections and access doors on each floor.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

We claim:

1. An elevator system for vertically moving barrels between a plurality of floors, comprising:
   a support frame extending between a upper end and a lower end, the support frame being located in an elevator shaft having a loading side and a storage side;
   a pair of spaced lifting chains extending between the upper end and the lower end;
   a plurality of cradle assemblies each connected to the pair of lifting chains for movement along a movement path between the upper end and the lower end, each of the cradle assemblies including at least a pair of cradle arms spaced from each other for supporting one of the barrels;
   at least one loading station located on the loading side of the elevator shaft, wherein the loading station includes a rail section coupled to a handle section such that the handle section is operable to move the rail section between a loading position to load or unload barrels from the plurality of cradle assemblies and a storage position; and
   a plurality of unloading stations located on the storage side of the elevator shaft, wherein the plurality of unloading stations each include a rail section coupled to a handle section such that the handle section is operable to move the rail section between a loading position to load or unload barrels from the plurality of cradle assemblies and a storage position.

2. The elevator system of claim 1 wherein the lifting chain is movable in a first direction to move the barrels from the loading station to the plurality of unloading stations.

3. The elevator system of claim 2 wherein the lifting chain is movable in a second direction to move the barrels from the plurality of unloading stations to the loading station, wherein the first direction is opposite to the second direction.

4. The elevator system of claim 1 further comprising a shield assembly positioned at each of the plurality of unloading stations and the loading station, the shield assembly including a barrel opening sized to allow the barrels to pass through the shield assembly.

5. The elevator system of claim 4 wherein the shield assembly includes at least one handle opening that allows the handle section to extend through the shield assembly.

6. The elevator system of claim 4 wherein the shield assembly includes a transparent window positioned above the barrel opening.

7. The elevator system of claim 1 wherein the rail section is pivotable connected to the handle section.

8. The elevator system of claim 1 wherein the rail section extends into the movement path of the plurality of cradle assemblies when the rail section is in the loading position and is spaced from the movement path in the storage position.

9. The elevator system of claim 8 wherein the rail section is sized to be received between the pair of cradle arms when the rail section is in the loading position and the cradle assembly moves past the unloading station.

10. An elevator system positionable within an elevator shaft having a loading side and a storage side for vertically moving barrels between a plurality of floors, comprising:
    a support frame extending between a upper end and a lower end, the support frame being located in the elevator shaft;
    a pair of spaced lifting chains extending between the upper end and the lower end;
    a plurality of cradle assemblies each connected to the pair of lifting chains for movement along a movement path between the upper end and the lower end, each of the cradle assemblies including at least a pair of cradle arms spaced from each other for supporting one of the barrels;

at least one loading station located at a loading opening on the loading side of the elevator shaft, wherein the loading station includes a rail section coupled to a handle section such that the handle section is operable to move the rail section between a loading position to load or unload barrels from the plurality of cradle assemblies and a storage position;

a plurality of unloading stations located at an unloading opening at each floor and on the storage side of the elevator shaft, wherein the plurality of unloading stations each include a rail section coupled to a handle section such that the handle section is operable to move the rail section between a loading position to load or unload barrels from the plurality of cradle assemblies and a storage position; and a shield assembly positioned at each of the plurality of unloading stations and the loading station, the shield assembly including a barrel opening sized to allow the barrels to pass through the shield assembly.

11. The elevator system of claim 10 wherein the shield assembly at the loading station at least partially blocks the loading opening and the shield assembly at each of the plurality of unloading stations at least partially blocks the unloading opening.

12. The elevator system of claim 11 wherein the shield assembly includes at least one handle opening that allows the handle section to extend through the shield assembly.

13. The elevator system of claim 12 wherein the shield assembly includes a transparent window positioned above the barrel opening.

14. The elevator system of claim 10 further comprising a variable speed drive motor operable to move the pair of lifting chains in both a first direction and an opposite second direction at a variable speed.

\* \* \* \* \*